US007479525B2

(12) United States Patent
Barsotti et al.

(10) Patent No.: US 7,479,525 B2
(45) Date of Patent: Jan. 20, 2009

(54) COATING COMPOSITIONS CONTAINING ISOCYANATE-FUNCTIONAL NON-AQUEOUS DISPERSED POLYMERS

(75) Inventors: Robert J. Barsotti, Franklinville, NJ (US); Laura Ann Lewin, Greenville, DE (US); Christopher Scopazzi, Wilmington, DE (US)

(73) Assignee: E.I. Du Pont De Nemours & Company, Wilmington, DE (US)

( * ) Notice: Subject to any disclaimer, the term of this patent is extended or adjusted under 35 U.S.C. 154(b) by 718 days.

(21) Appl. No.: 10/673,831

(22) Filed: Sep. 29, 2003

(65) Prior Publication Data

US 2004/0072955 A1    Apr. 15, 2004

Related U.S. Application Data

(62) Division of application No. 09/901,394, filed on Jul. 9, 2001, now Pat. No. 6,632,880.

(51) Int. Cl.
*C08L 51/00*    (2006.01)
(52) U.S. Cl. .................... 525/64; 525/69; 525/293
(58) Field of Classification Search .......... 525/293, 525/64, 69
See application file for complete search history.

(56) References Cited

U.S. PATENT DOCUMENTS

| 4,134,935 | A | * | 1/1979 | Quiring et al. | ........ | 525/440 |
| 5,021,177 | A | * | 6/1991 | Kapuscinski et al. | ........ | 508/471 |
| 5,231,137 | A | * | 7/1993 | Fisher et al. | ........ | 525/176 |
| 5,310,807 | A | * | 5/1994 | Antonelli et al. | ........ | 525/286 |
| 7,071,264 | B2 | * | 7/2006 | Darling et al. | ........ | 525/327.4 |

OTHER PUBLICATIONS

Yukawa et al., "Self-crosslinkable graft copolymer . . . ", Progrees in Organic Coatings 24, 359-379 (1994).*

* cited by examiner

*Primary Examiner*—Jeffrey C Mullis
(74) *Attorney, Agent, or Firm*—Brian J. Myers

(57) ABSTRACT

A coating composition containing about 40-90% by weight of film forming binder and 10-60% by weight of an organic liquid carrier; wherein the binder contains about (a) 10-70% by weight, based on the weight of the binder, of a dispersed gelled acrylic polymer having
  (i) a core of gelled polymerized ethylenically unsaturated monomers which is not soluble in the organic liquid carrier and having chemically grafted thereto
  (ii) substantially linear stabilizer polymeric components that are soluble in the organic liquid carrier and comprise polymerized ethylenically unsaturated monomers and have a weight average molecular weight of about 500-20,000 determined by GPC (gel permeation chromatography) using polystyrene as the standard;

wherein the core, the stabilizer polymeric component, or both contain at least 3% by weight of polymerized ethylenically unsaturated monomers having isocyanate groups attached thereto that are capable of reacting with component (b);

(b) 30-90% by weight, based on the weight of the binder, of an oligomer or polymer or both having functional groups capable of reacting with the isocyanate groups of component (a); and (c) 0-60% by weight, based on the weight of the binder, of an organic polyisocyanate crosslinking agent.

10 Claims, No Drawings

COATING COMPOSITIONS CONTAINING ISOCYANATE-FUNCTIONAL NON-AQUEOUS DISPERSED POLYMERS

CROSS-REFERENCE TO RELATED APPLICATION

This application is a divisional of application Ser. No. 09/901,394 filed on Jul. 9, 2001 allowed on Jul. 29, 2003.

TECHNICAL FIELD

This invention relates to high solids solvent based coating compositions having a low VOC (volatile organic content) and in particular to a clear coating composition useful for refinishing clear coat/color coat finishes of a vehicle such as an automobile or a truck.

BACKGROUND OF THE INVENTION

Clear coat/color coat finishes for automobiles and trucks have been used in recent years and are very popular. Kurauchi et al U.S. Pat. No. 4,728,543 issued Mar. 1, 1988 and Benefiel et al U.S. Pat. No. 3,639,347 issued Feb. 1, 1972 show the application of a clear coat to a color coat or basecoat in a "wet on wet" application, i.e., the clear coat is applied before the color coat is completely cured.

There is a need for a clear coating composition that can be used to repair these clear coat/color coat finishes that has a low VOC to meet with pollution regulations for refinishing vehicles, that cures rapidly to a tack free coating at ambient temperatures, and that can be buffed in a relatively short period of time thereafter to a high gloss finish. Such a combination of properties is not provided by the prior art coatings, as for example, as shown in Lamb et al U.S. Pat. No. 5,286,782 issued Feb. 15, 1994 and Barsotti et al U.S. Pat. No. 5,763,528 issued Jun. 9, 1998.

The novel coating composition of this invention has the aforementioned desirable characteristics.

SUMMARY OF THE INVENTION

A coating composition containing about 40-90% by weight of film forming binder and 10-60% by weight of an organic liquid carrier;
wherein the binder contains about
(a) 10-70% by weight, based on the weight of the binder, of a dispersed gelled acrylic polymer having
 (i) a core of gelled polymerized ethylenically unsaturated monomers which is not soluble in the organic liquid carrier and having chemically grafted thereto
 (ii) substantially linear stabilizer polymeric components that are soluble in the organic liquid carrier and comprise polymerized ethylenically unsaturated monomers and have a weight average molecular weight of about 500-20,000 determined by GPC (gel permeation chromatography) using polystyrene as the standard;
wherein the core, the stabilizer polymeric component, or both contain at least 3% by weight of polymerized ethylenically unsaturated monomers having isocyanate groups attached thereto that are capable of reacting with component (b);
(b) 30-90% by weight, based on the weight of the binder, of an oligomer or polymer or both having functional groups capable of reacting with the isocyanate groups of component (a); and
(c) 0-60% by weight, based on the weight of the binder, of an organic polyisocyanate crosslinking agent.

Dispersed gelled acrylic polymers of the foregoing composition are also a part of this invention.

DETAILED DESCRIPTION OF THE INVENTION

In repairing a clear coat/color coat finish of an automobile or truck, generally the color coat is applied and dried for a short time but not cured and then the clear coat is applied and both coats are cured. If necessary, the cured clear coat is buffed to improve appearance and remove minor imperfections. The coating composition of this invention has a short drying time and thereby improves the rate of processing vehicles through a typical repair facility. In particular, the novel composition has a short tack and dust free time when used as a clear finish so that the vehicle can be moved out of the work area to provide room for another vehicle to be painted. The novel composition when used as a clear finish is buffable in a short period of time after application and initially drying and remains buffable for several days, preferably up to one week before it cures into a hard durable finish. For a finish to be buffable it must be hard but not tough.

Preferably, the coating composition of this invention when used as a clear coat dries to tack free state in about two hours of application and can be buffed in about three hours of application.

The novel coating composition is solvent based and contains about 10-60% by weight of an organic liquid carrier and correspondingly, about 90-40% by weight of film forming binder and preferably has a VOC of about 3.5-4.5 pounds of solvent per gallon of coating composition. The binder contains (a) about 10-70% by weight, preferably 20-60%, most preferably 30-50%, of a dispersed gelled acrylic polymer having isocyanate functionality, (b) about 30-90% by weight, preferably 40-80%, most preferably 50-70%, of an oligomer or polymer or a combination thereof having functional components that are reactive with the isocyanate groups on the dispersed gelled acrylic polymer, and (c) about 0-60% by weight, preferably 0-50%, most preferably 0-30%, of a polyisocyanate crosslinking agent capable of reacting with the functional components on the oligomer or polymer. Herein, binder components (a) plus (b) plus (c) are considered to equal 100 weight percent, and other components are calculated as parts (weight) relative to 100 parts of (a) plus (b) plus (c).

Generally, the novel coating composition is used as a clear coat but can be pigmented with conventional pigments and used as a monocoat or as basecoat.

The dispersed gelled acrylic polymer (also referred to herein as a non-aqueous dispersion or NAD polymer) used to formulate the coating composition of this invention is prepared from a macromonomer which forms the linear stabilizer polymeric components that are chemically grafted to a core.

Preferably, the polymer contains about 30-70% by weight of the core and 70-30% by weight of substantially linear stabilizer polymeric components. These linear stabilizer components are soluble in the organic carrier liquid used to form the coating composition and keep the acrylic polymer dispersed in the liquid while the core is insoluble in this liquid. These macromonomers which form the stabilizer polymeric components of the polymer comprise polymerized alpha-beta ethylenically unsaturated monomers and have one ethylenically unsaturated moiety preferably but not necessarily at the terminal end and have a weight average molecular weight (Mw) of 500-20,000, preferably 1,000 to 10,000. The core, conversely, is formed from a high molecular weight polymer having a weight average molecular weight (Mw) of 50,000 to 500,000, preferably 50,000 to 200,000. About 25-75% (by weight), preferably 40-60%, of the macromonomer is copolymerized with 75-25%, preferably 60-40%, of a blend of other alpha-beta ethylenically unsaturated monomers which form the core of the acrylic polymer.

In the present invention, the core, the stabilizer component, or both contain isocyanate groups that are capable of reacting with the other binder components present in the coating composition. More particularly, at least 3%, preferably 3-30% by weight, of the polymerized monomers in the core, stabilizer component or in both have isocyanate groups attached thereto. The isocyanate groups can be attached by post reaction of isocyanate reactive functional groups in the core, the macromonomer, or both with polyisocyanates, e.g., di- and triisocyanates. The isocyanate groups can also be attached to the dispersed acrylic gelled polymer by copolymerization of isocyanate functional monomers with the core, macromonomer, or both.

In the present composition, while both the stabilizer components and the core may contain isocyanate groups, it is generally preferred to have such reactive functionality only or essentially only or substantially only on the stabilizer components. It is to be understood that the core or macromonomers referred to as having isocyanate functionality may be part of a mixture of core polymers or macromonomers of which a portion do not have any functionality or variable amounts of functionality. It is also understood that, in preparing any core or macromonomers, there is a normal distribution of functionality.

The dispersed gelled acrylic polymer may be, and preferably is, prepared by polymerizing ethylenically unsaturated monomers that comprise the insoluble core in the presence of macromonomers, each macromonomer having at least one ethylenic unsaturation component preferably but not necessary in the terminal component. The acrylic polymer can be envisioned as being composed of a core having a plurality of macromonomer stabilizer components attached thereto.

Macromonomers can be prepared by conventional techniques as shown in Barsotti et al U.S. Pat. No. 5,763,528 issued Jun. 9, 1998 (see Example 2) using conventional catalysts.

In a preferred method for preparing macromonomers, a catalytic chain transfer agent is used to ensure that the resulting macromonomer only has one terminal ethylenically unsaturated group which will polymerize with the core monomers to form the acrylic polymer. Typically, in the first step of the process for preparing the macromonomer, the monomers are blended with an organic solvent and a cobalt chain transfer agent and heated usually to the reflux temperature of the reaction mixture. In subsequent steps additional monomers and conventional polymerization catalyst and optional additional cobalt chain transfer agent are added and polymerization is continued until a macromonomer is formed of the desired molecular weight. The cobalt approach is also described in Barsotti et al U.S. Pat. No. 5,763,528 issued Jun. 9, 1998 (see Example 1) Preferred cobalt chain transfer agents or catalysts are described in Janowicz et al U.S. Pat. No. 4,680,352 issued Jul. 14, 1987 and Janowicz U.S. Pat. No. 4,722,984 issued Feb. 2, 1988. Most preferred are pentacyanocobaltate(II), diaquabis(borondifluorodimethyl-glyoximato) cobaltate(II) and diaquabis(borondifluorodiphenylglyoximato) cobaltate(II). Cobalt(III) versions of these catalysts are also preferred. Typically these chain transfer agents are used at concentrations of about 5-1000 ppm based on the monomers used.

The macromonomer is preferably formed in a solvent or solvent blend using a free radical initiator and a Co(II) or (III) chelate chain transfer agent. Examples of such solvents are aromatics, ketones, glycol ethers, acetates, alcohols as, e.g., methyl ethyl ketone, isopropyl alcohol, n-butyl glycol ether, n-butyl diethylene glycol ether, propylene glycol methyl ether acetate, propylene glycol methyl ether, and N-butanol.

Free radical initiators such as peroxy- and azo-initiators (0.5-5% weight on monomer) are typically used in the synthesis of the macromonomers in the presence of 2-5,000 ppm (on total monomer) or Co(II) chelate in the temperature range between 70-160° C., more preferably azo-type initiators as, e.g., 2,2'-azobis (2,4 dimethylpentane nitrile), 2,2'-azobis(2-methylpropane nitrile), 2,2'-azobis (2-methylbutane nitrile), 1,1'-azo(cyclohexane carbonitrile) and 4,4'-azobis(4-cyanopentanoic) acid.

After the macromonomer is formed as described above, solvent is optionally stripped off and the monomers that comprise the core polymers are added to the macromonomer along with additional solvent and polymerization catalyst. Any of the aforementioned azo-type catalysts can be used as can other suitable catalysts such as peroxides and hydroperoxides. Typical of such catalysts are di-tertiarybutyl peroxide, di-cumylperoxide, tertiaryamyl peroxide, cumenehydroperoxide, di(n-propyl)peroxydicarbonate, peresters such as amyl peroxyacetate and the like. Commercially available peroxy type initiators include, e.g., t-butylperoxide or Triganox® B from AKZO, t-butylperacetate or Triganox® FC50 from AKZO, t-butylperbenzoate or Triganox® C from AKZO, and t-butylperpivalate or Triganox® 25 C-75 from AKZO.

Polymerization is continued at or below the reflux temperature of the reaction mixture until the acrylic polymer is formed of the desired molecular weight. During the polymerization or afterward, non-solvent(s) for the core are added to form low viscosity sprayable polymer dispersion rather than a polymer solution having a relatively high viscosity which would require further dilution with solvents for spraying thereby increasing the VOC content of the composition. It is generally preferred to have the non-solvent(s) for the core present during the polymerization.

Typical solvents that are non-solvents for the core are aliphatics such as heptane, octane, N-decane, or mineral spirits and the like.

Typical monomers that can be used to form the core or the macromonomers are for example (but not limited to), acrylic and methacrylic acid esters of straight-chain or branched monoalcohols of 1 to 20 carbon atoms. Preferred esters are alkyl acrylates and methacrylates having 1-12 carbons in the alkyl group such as methyl acrylate, ethyl acrylate, propyl acrylate, isopropyl acrylate, butyl acrylate, pentyl acrylate, hexyl acrylate, 2-ethyl hexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethyl hexyl methacrylate, nonyl methacrylate, lauryl methacrylate and the like. Cycloaliphatic acrylates and methacrylates can be used such as trimethylcyclohexyl acrylate, t-butyl cyclohexyl acrylate, isobornyl acrylate, cyclohexyl methacrylate, isobornyl methacrylate, and the like. Aryl acrylates and methacrylates such as benzyl acrylate and benzyl methacrylate also can be used.

Suitable other ethylenically unsaturated comonomers that can be used for forming the core or macromonomer include: acrylamide and methacrylamide and derivatives as alkoxy methyl(meth)acrylamide monomers, such as methacrylamide, N-isobutoxymethyl methacrylamide, and N-methylol methacrylamide; maleic, itaconic and fumaric anhydride and its half and diesters; vinyl aromatics such as styrene, alpha methyl styrene and vinyl toluene; and polyethylene glycol monoacrylates and monomethacrylates.

Other monomers such as itaconic or maleic anhydride, the half ester thereof, acrylonitrile, allyl methacrylate, aceto acetoxyethyl methacrylate, trialkoxy silyl ethyl methacrylate, reaction products of mono epoxy esters or monoepoxy ethers with alpha-beta unsaturated acids and reaction products of glycidyl(meth)acrylate with mono functional acids up to 22 carbon atoms can be used.

Ethylenically unsaturated epoxy functional monomers can also be used such as glycidyl acrylate and glycidyl methacrylate. Polymerizable acid functional monomers can be used such as acrylic acid, methacrylic acid, maleic acid, itaconic acid and the like. Methacrylic and acrylic acid are preferred. Other acids that can be used are ethylenically unsaturated sulfonic, sulfinic, phosphoric or phosphonic acid and esters thereof; typically, styrene sulfonic acid, acrylamido methyl propane sulfonic acid, vinyl phosphonic or phosphoric acid and its esters and the like, also can be used.

Other functional monomers that can be used for forming the core or macromonomer include ethylenically unsaturated hydroxy functional monomers. Examples of ethylenically unsaturated monomers containing hydroxy groups include hydroxy alkyl acrylates and hydroxy alkyl methacrylates, wherein the alkyl group has 1 to 4 carbon atoms can be used. Suitable monomers include hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate, and the like, and mixtures thereof. Hydroxy functionality can also be obtained from monomer precursors, for example, the epoxy group of a glycidyl methacrylate or glycidyl acrylate unit in a polymer. Such an epoxy group may be converted, in a post polymerization reaction with water or a small amount of acid, to a hydroxy group.

Polymerizable amine functional monomers can also be used. Examples of secondary amine functional monomers that can be used include alkylamino alkyl acrylates and methacrylates having 1-8 carbon atoms in the alkyl groups. Suitable monomers include t-butyl amino ethyl acrylate or methacrylate. Polymerizable tertiary amine functional monomers can also be used such as dimethyl amino ethyl methacrylate or acrylate.

In the synthesis of the acrylic polymer small amounts of difunctional alpha-beta unsaturated compounds can also be used as, e.g., allyl methacrylate or acrylate, ethylene glycol dimethacrylate or hexane diol diacrylate.

The core of the acrylic polymer is gelled or crosslinked during its polymerization through the use of any of the aforementioned difunctional monomers, especially allyl methacrylate. Optionally, the gelled polymers can be generated by post reacting polymers having glycidyl epoxy groups in the core with acid functional monomers (or vice versa) or by addition of polyamine such as ethylene diaamine, or by post reacting polymers having hydroxy groups in the core with oligomeric di- or triisocyanates such as hexamethylene diisocyanate.

As indicated above, a couple of approaches can be used to introduce the isocyanate groups into the macromonomer or the core or both. Isocyanate groups can be introduced by post reacting isocyanate reactive functional groups in the acrylic polymer (core and/or macromonomer) with polyisocyanate compounds. Examples of isocyanate reactive groups in the polymer are hydroxy and secondary amine groups. Such reactive groups can be built into the core, macromonomer, or both during its polymerization through use of suitable hydroxy or secondary amine functional ethylenically unsaturated comonomers. Any of the aforementioned hydroxy or secondary amine functional monomers can be used to form these isocyanate reactive groups on the acrylic polymer.

When post reacting the polyisocyanate with such isocyanate reactive groups, the reaction conditions should be chosen so that 100% of the forgoing isocyanate reactive functional groups are reacted with the polyisocyanate, or as close to 100% as can be reasonably achieved. It is generally preferred to use excess isocyanate to drive the reaction to completion. This will result in some of the isocyanate molecules being unattached to the dispersed gelled acrylic polymer. Component (a) is this instance will then be a mixture of unreacted isocyanate and isocyanate functional NAD. The equivalent ratio of NCO to OH/NH groups used during synthesis preferably ranges from 5:1 to 50:1. Typically if the ratio is less than 5:1, the stability of the NAD is compromised. If the ratio is greater than 50:1, the amount of NAD particles introduced in the final coating is insufficient to improve the tack free drying time of the coating.

Any conventional aromatic, aliphatic, cycloaliphatic polyfunctional isocyanates having at least two isocyanate groups per molecule, including difunctional isocyanates, trifunctional isocyanates and isocyanate functional adducts of a polyol and a diisocyanate can be used to modify the foregoing isocyanate reactive functionalities and introduce the isocyanate groups in the polymer.

Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopenthylene diisocyanate, 1,4-cyclohexylene diisocyanate, 1,3-phenylene diisocyanante, 1,5-naphthalene diisocyanate, bis-(4-isocyanatocyclohexyl)-methane, diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates also can be used such as the trimer of hexamethylene diisocyanate which is sold under the tradename Desmodur® N-3390, the trimer of isophorone diisocyanate which is sold under the tradename Desmodur® Z-4470 and the like.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidene diisocyanate and trimtheylol propane and is sold under the tradename of Cythane® 3160.

In alternate approach, isocyanate groups can be introduced in the acrylic polymer (core and/or macromonomer) by adding ethylenically unsaturated isocyanate functional monomers during polymerization of the macromonomer, the core, or both. Examples of isocyanate functional monomers that can be used to introduce isocyanate groups into the acrylic polymer during its polymerization include isocyanatoethyl methacrylate, isocyanatoethyl acrylate, meta-tetramethyl xylylene isocyanate and the like. While practicing this approach, functional monomers that are reactive with isocyanates must be absent in the core and macromonomer. These functional monomers include any of the aforementioned monomers having hydroxy, amine, or acid groups.

Other possibilities for introducing isocyanate groups into the acrylic polymer (core and/or macromonomer) will be apparent to persons skilled in the art.

In the present invention, the preferred average particle size of the core is in the range of 0.1 to 1 microns, preferably in the range from 0.2 to 0.5 microns.

The core of the acrylic polymer is a gelled structure. Particularly useful acrylic polymers include the following:

an acrylic polymer having a core of polymerized monomers of styrene, methyl methacrylate, glycidyl methacrylate, methacrylic acid, hydroxy ethyl acrylate, methyl acrylate and allyl methacrylate and stabilizing polymeric components of a macromonomer of 2-ethyl hexyl methacrylate, isobornyl methacrylate, butyl methacrylate, hydroxyethyl methacrylate, t-butyl aminoethyl methacrylate, and having the gelled polymer post reacted with di- or tri-isocyanates to attach the isocyanate groups thereto.

an acrylic polymer having a core of polymerized monomers as above and stabilizing polymeric components of a macromonomer of butyl acrylate, butyl methacrylate, hydroxy ethyl acrylate, styrene, glycidyl methacrylate, and methacrylic acid, and having the gelled polymer post reacted with a di- or tri-isocyanate to attach isocyanate groups thereto.

an acrylic polymer having a core of polymerized monomers of styrene, methyl methacrylate, methyl acrylate, isocyanato ethyl methacrylate, allyl methacrylate, and glycidyl methacrylate, and stabilizing polymeric components of a macromonomer of styrene, butyl acrylate, butyl methacrylate, isobornyl methacrylate, isocyanato ethyl methacrylate and hydroxy ethyl acrylate.

The coating composition of this invention formed with the above described acrylic polymer dispersion also contains an oligomer or polymer or another dispersed gelled polymer or combination thereof having functional components that are reactive with the isocyanate groups on the dispersed gelled acrylic polymer.

Useful oligomers have a weight average molecular weight of about 200-2,000 and a polydispersity of less than 1.7 and have functional components capable of reacting with the isocyanate groups on the dispersed gelled acrylic polymer.

Typically useful oligomers include hydroxy functional caprolactone oligomers which may be made by reacting caprolactone with a cyclic polyol. Particularly useful caprolactone oligomers are described on col. 4., line 3—col. 5, line 2 of Lamb et al U.S. Pat. No. 5,286,782 issued Feb. 15, 1994. Other useful oligomers are polyester oligomers such as an oligomer of an alkylene glycol, like propylene glycol, an alkane diol, like hexane diol, and an anhydride like methyl hexahydrophthalic anhydride reacted to a low acid number. Another useful oligomer is an acid functional oligomer such as an oligomer of a polyol such as pentaerythritol reacted with an anhydride such as methyl hexahydrophthalic anhydride to an acid number of about 30-300, preferably 150-250. Other useful oligomers are hydroxy functional and are formed by reacting 1,2 epoxy butane with the above described acid functional oligomers using triethyl amine as a reaction catalyst resulting in very low (less than 20) acid number oligomers. Particularly useful hydroxy functional oligomers are described in Barsotti et al U.S. Pat. No. 6,221,494 issued Apr. 24, 2001.

Additional reactive oligomers include aldimine oligomers which are the reaction products of alkyl aldehydes, such as, isobutyraldehyde with diamines, such as isophorone diamine. Ketimine oligomers which are the reaction product of alkyl ketones, such as, methyl isobutyl ketone with diamines, such as, 2-methyl pentamethylene diamine. Polyaspartic esters, which are the reaction product of diamines, such as, isopherone diamine with dialkyl maleates, such as, diethyl maleate. All of the foregoing additional molecules are well known in the art.

Acrylic polymers or polyesters having functional components capable of reacting with isocyanate groups can also be used. It is generally preferred to use such polymers in combination with any of the aforementioned oligomers for improved film integrity. Typically useful acrylic polymers include hydroxy functional acrylic polymers having a weight average molecular weight in the range from 2,000 to 50,000, preferably 3,000 to 20,000 and a Tg preferably in the range of 0° C. to 80° C., which are made from typical monomers such as acrylates, methacrylates, styrene and the like and functional monomers such as hydroxy ethyl acrylate, glycidyl methacrylate, or gamma methacryly propyl trimethoxy silane and the like.

Typically useful polyesters have a weight average molecular weight in the range from 2,000 to 50,000, preferably from 2,000 to 5000 and a Tg preferably in the range from −20° C. to 100° C. The polyesters suitable for use in the invention are conventionally polymerized from suitable polyacids, including cycloaliphatic polycarboxylic acids, and suitable polyols, which include polyhydric alcohols. The details of polyesters suitable for use in this invention are provided in Hoffman et al U.S. Pat. No. 5,326,820 issued Jul. 5, 1994, which is incorporated herein by reference. One of the commercially available polyester, which is particularly preferred, is SCD®-1040 polyester, which is supplied by Etna Product Inc., Chagrin Falls, Ohio.

Hydroxy functional dispersed gelled acrylic polymers can also be used in the coating composition. Examples of such polymers include acrylic polymers which have a core formed from polymerized monomers of methyl methacrylate, glycidyl methacrylate, methacrylic acid, methyl acrylate and stabilizing polymeric components formed from a macromonomer of styrene, butyl methacrylate, butyl acrylate, hydroxy ethyl acrylate, methacrylic acid, isobornyl methacrylate, and glycidyl methacrylate. The core is formed from a high molecular weight polymer having a weight average molecular weight of 50,000 to 500,000, preferably in the range of from 50,000 to 200,000. The arms make up about 10 to 90 percent of the polymer and are formed from low molecular weight macromonomer having an average molecular weight of in the range from about 500 to 20,000, preferably 3,000 to 20,000. The details of these hydroxy functional dispersed polymers which can be used in the present composition are provided in Barsotti et al. U.S. Pat. No. 5,763,528 (see Examples 1 and 2), which is incorporated by reference herein.

Compatible mixtures of any of the aforementioned oligomers or polymers can also be used.

Optionally, the isocyanate functional dispersed gelled acrylic polymer described above can be combined with an organic polyisocyanate crosslinking agent to enhance the film forming ability of the coating composition. As with the dispersed gelled acrylic polymer, these compounds are reactive with the oligomer or polymer described above. Any of the conventional aromatic, aliphatic, cycloaliphatic diisocyanates, triisocyanates and isocyanate functional adducts of a polyol and a diisocyanate as described above can be used. Blocked polyisocyanates also can be used. Typical blocking agents are alcohols, ketimines, oximes and the like.

In the coating composition of the present invention, the aforementioned isocyanate components, also referred to herein as the activator, are typically stored separately from the other binder components prior to application.

To improve weatherability of the clear composition about 0.1-10% by weight, based on the weight of the binder, of ultraviolet light stabilizers screeners, quenchers and antioxidants can be added. Typical ultraviolet light screeners and stabilizers include the following:

Benzophenones such as hydroxy dodecycloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxy-phenyl-triazole and the like.

Hindered amines such as bis(1,2,2,6,6-pentamethyl-4-piperidinyl sebacate), di[4(2,2,6,6-tetramethyl piperidinyl)] sebacate and the like and any mixtures of any of the above.

The coating composition contains sufficient amount of a catalyst or catalyst blend to cure the composition at ambient temperatures. Generally, about 0.01-2% by weight, based on the weight of the binder, of catalyst is used. Typically useful catalysts are triethylene diamine and alkyl tin laurates such as dibutyl tin dilaurate, dibutyl tin diacetate, tertiary amines and the like.

Generally, flow control agents are used in the composition in amounts of about 0.1-5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the coating composition which have the same refractive index as the dried coating. Typically, useful pigments have a particle size of about 0.015-50 microns and are used in a pigment to binder weight ratio of about 1:100 to 10:100 and are inorganic siliceous pigments such as silica pigment having a refractive index of about 1.4-1.6.

In the application of the coating composition as a clear coating to a vehicle such as an automobile or a truck, the basecoat which may be either a solvent based composition or a waterborne composition is first applied and then dried to at least remove solvent or water before the clear coating is applied usually by conventional spraying. Electrostatic spraying may also be used. The dry film thickness of the clear coating is about 0.5-5 mils. The clear coating is dried at ambient temperatures generally in less than 5 minutes to a tack and dust free state. Moderately higher temperatures up to about 40° C. also can be used. As soon as the clear coating is sufficiently cured to be dust free and tack free the vehicle can be moved from the work area to allow for the refinishing of another vehicle.

Generally, within about 3 hours after application, the clear coating is sufficiently cured to allow for buffing and polishing if needed to remove imperfections and improve gloss of the finish. The clear coating continues to cure and after 7-10 days reaches a relatively high level of hardness and toughness that is required for a durable and weatherable automotive finish.

The coating composition of this invention can also be pigmented and used as a base coat in a clear coat/color coat finish or as a monocoat. Typical pigments that are used in such a coating composition are metallic oxides such as titanium dioxide, iron oxides of various colors, zinc oxide, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbazole violet, isoindolinones, isoindolones, thioindigo reds, benzimilazolinones, and metallic flake pigments such as aluminum flake, nickel flake and the like.

Coating compositions of this invention have excellent adhesion to a variety of metallic or non-metallic substrates, such as previously painted substrates, cold rolled steel, phosphatized steel, and steel coated with conventional primers by electrodeposition. These coating composition can be used to coat plastic substrates such as polyester reinforced fiberglass, reaction injection-molded urethanes and partially crystalline polyamides.

Coating compositions of this invention can be applied by conventional techniques such as spraying, electrostatic spraying, dipping, brushing, flowcoating and the like. The preferred techniques are spraying and electrostatic spraying. In refinish applications, the composition is dried and cured at ambient temperatures but can be forced dried at elevated temperatures of 40-100° C. for about 5-30 minutes. For OEM applications, the composition is typically baked at 100-150° C. for about 15-30 minutes to form a coating about 0.1-3.0 mils thick. When the composition is used as a clearcoat, it is applied over the color coat which may be dried to a tack-free state and cured or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The invention will be further described by reference to the following Examples. All parts and percentages are on a weight basis unless otherwise indicated. All molecular weights disclosed herein are determined by GPC (gel permeation chromatography) using a polystyrene standard.

EXAMPLES

The following examples (Examples 1-6) show the preparation of non-aqueous dispersion polymers containing isocyanate functionality. All preparations were carried out under a nitrogen blanket.

Example 1

A non-aqueous dispersion polymer containing isocyanate functionality was prepared by the following procedure:

Preparation of Macromonomer Stabilizer Component

To a 2-liter flask fitted with an agitator, water condenser, thermocouple, nitrogen inlet, heating mantle, and addition pumps and ports was added 166.3 grams ethyl acetate, 101.4 grams butyl acetate and 72 grams of the monomer mixture described below was added under agitation and heated to reflux (89 to 93° C.). To this was added, as a shot, a mixture of 16.5 grams of the initiator solution described below and 15.0 grams of a 10% solution of bis(boron difluoro diphenyl glyoximato)cobaltate(II) in ethyl acetate. The remainder of the monomer mixture of 70.4 grams hydroxy ethyl methacrylate, 211.2 grams 2-ethyl hexyl methacrylate, 105.6 grams isobornyl methacrylate, 274.6 grams butyl methacrylate, 42.2 grams t-butyl aminoethyl methacrylate and 15.9 grams ethyl acetate was then added to the flask via the addition pumps simultaneously with the remainder of the initiator solution of 13.3 grams Vazo® 52 (2,2'-azobis (2,4-dimethylpentane nitrile)) by DuPont Co., Wilmington, Del. and 154.9 grams ethyl acetate. The monomer mixture was added over 180 minutes and the initiator mixture fed over a period of 330 minutes. 5.9 Grams ethyl acetate was added as a shot after completion of the initiator feed and 16.6 grams of butyl acetate were added as a shot after completion of the monomer feed. The reaction mixture was maintained at reflux (89 to 93° C.) throughout the polymerization process. The reaction mixture was held at reflux for an additional 30 minutes after the initiator feed had been completed. A mixture of 0.3 grams t-butyl peroctoate and 16.6 grams ethyl acetate was then added as a shot and the reaction mixture held at reflux for an additional 30 minutes. Following this, the reaction mixture was then cooled to room temperature. The resulting polymer solution had weight solids of 58.2% and Brookfield viscosity of 1220 cps measured at 5 rpm using spindle number 3. The number average molecular weight of the macromonomer was 5,702, weight average molecular weight 10,974 both as determined by GPC (gel permeation chromatography) using polystyrene as the standard.

Preparation of Non-Aqueous Dispersion Polymer

To a 2-liter flask equipped as above was added 436.1 grams of macromonomer composition prepared above, 86.7 grams mineral spirits, 229.8 grams heptane and 7.6 grams ethyl acetate. This mixture was agitated and heated to reflux (89 to 93° C.). A monomer mixture chosen for the core of 58.7 grams styrene, 163.6 grams methyl methacrylate, 73.9 grams glycidyl methacrylate, 96.5 grams hydroxyethyl acrylate, 2.3 grams methacrylic acid, 64.0 grams methyl acrylate and 2.3 grams allyl methacrylate was added to the flask via the addition pumps and ports simultaneously with an initiator mixture of 37.9 grams mineral spirits, 12.3 grams butyl acetate and 6.9 grams t-butyl peroctoate. Both the monomer and initiator mixtures were simultaneously added over 210 minutes The batch was held at reflux (89 to 93° C.) throughout the polymerization process. 19.5 Grams of butyl acetate were then added as a shot after completion of the two feeds and the reaction mixture then held at reflux for an additional 90 minutes. A mixture of 0.2 grams Vazo® 67 (2,2'-azobis(methylbutanenitrile)) by DuPont Co., Wilmington, Del., 18 grams butyl acetate and 0.2 grams dimethyl ethanol amine was then added over 5 min. The reaction mixture was held at reflux for an additional 120 minutes. 109.7 Grams of solvent was then removed by distillation and the reaction mixture cooled to room temperature. The resulting non-aqueous polymer dispersion composition has weight solids of 61.5% and Brookfield viscosity of 1260 cps measured at 5 rpm using spindle number 3.

Preparation of Isocyanate-Functional NAD Polymer

To a 2-liter flask fitted with an agitator, water condenser, and additional pumps and ports, was added 726.3 grams of a 58% weight solution of hexamethylene diisocyanate (HDI) trimer in butyl acetate, xylene and propylene glycol monomethyl ether acetate and 4.85 grams of a 1% weight solution of dibutyl tin dilaurate in butyl acetate. The mixture was agitated for 5 minutes at which time a mixture of 236.5 grams of non-aqueous dispersion prepared above and 132.3 grams propylene glycol monomethyl ether acetate was added over 60 minutes. The reaction mixture was further agitated for 10 minutes. The resulting composition had a percent weight solids of 51.3 and Gardner—Holdt viscosity was C.

Example 2

A non-aqueous dispersion polymer containing isocyanate functionality was prepared by the following procedure:

Preparation of Macromonomer Stabilizer Component

To a 12-liter flask fitted with an agitator, water condenser, thermocouple, nitrogen inlet, heating mantle, and addition pumps and ports was added 2392.2 grams xylene which was agitated and heated to reflux (134 to 139° C.). To this was then added, a monomer mixture comprising of 1141 grams styrene, 513.4 grams butyl methacrylate, 1654.5 grams butyl acrylate, 741.7 grams hydroxyethyl acrylate, 131.3 grams methacrylic acid and 1426.3 grams isobornyl methacrylate via the addition pumps and ports simultaneously with an initiator mixture comprising 272.3 grams t-butyl peracetate and 787.8 grams xylene. The monomer mixture was added over 240 minutes and the addition time for the initiator mixture was 270 minutes. The batch was held at reflux (134 to 139° C.) throughout the polymerization process. 113.4 Grams of xylene was then added as a shot and the batch was held at reflux for an additional 30 minutes following completion of the initiator feed. The following materials were then added, in order to the reaction mixture: 0.23 grams beta-catechol dissolved in 2.38 grams isopropanol, 99.5 grams glycidyl methacrylate, 1.4 grams dimethyl ethanol amine and 22.7 grams isopropanol. The reaction mixture was then held at reflux for 120 minutes and then cooled to room temperature. The resulting polymer solution had weight solids of 62.9% and Brookfield viscosity of 1020 cps measured at 5 rpm using spindle number 3. The number average molecular weight of the resulting macromonomer was 3,623, weight average molecular weight 9,131 both as determined by GPC (gel permeation chromatography) using polystyrene as standard.

Preparation of Non-Aqueous Dispersion Polymer

To a 2-liter flask equipped as above was added 348.7 grams macromonomer stabilizer prepared above, 55.8 grams mineral spirits, 149.9 grams heptane, 24.4 grams isopropanol and 8.7 grams ethyl acetate. This mixture was agitated and heated to reflux (92 to 95° C.) at which time 0.7 grams of t-butyl peroctoate and 5.2 grams heptane were added as a shot to the flask. A monomer mixture of 59.8 grams styrene, 197.0 grams methyl methacrylate, 37.5 grams glycidyl methacrylate, 98.1 grams hydroxyethyl acrylate, 9.4 grams methacrylic acid, 67.5 grams methyl acrylate, 14 grams heptane and 14 grams ethyl acetate was then added to the flask via the addition pumps and ports simultaneously with an initiator mixture of 34.9 grams mineral spirits, 27.9 grams heptane and 7.4 grams t-butyl peroctoate. During this addition, both the monomer and initiator mixtures were simultaneously added over 210 minutes. The batch was maintained at reflux (92 to 95° C.) throughout the polymerization process. 10.0 Grams of ethyl acetate were then added as a shot and the reaction mixture was held at reflux for an additional 120 minutes after the initiator and monomer mixture feeds were completed. A mixture of 2.4 grams t-butyl peroctoate, and 20.9 grams butyl acetate was then added over 30 min. The reaction mixture was again held at reflux for an additional 60 minutes. 94.2 Grams of solvent was then removed by distillation and the reaction mixture was cooled to room temperature. The resulting non-aqueous polymer dispersion had a weight solids of 64.2% and Brookfield viscosity of 1060 cps measured at 5 rpm using spindle number 3.

Preparation of Isocyanate-Functional NAD Polymer

To a 2-liter flask fitted with an agitator, water condenser, and addition pumps and ports, was added 155.7 grams of non-aqueous dispersion prepared above, 120.1 grams of a 70% solution of isophorone diisocyanate (IPDI) trimer in butyl acetate, 77.8 grams of propylene glycol monomethyl ether acetate and 2.78 grams of a 2% solution of dibutyl tin dilaurate in ethyl acetate. The mixture was agitated and heated to 70° C. under nitrogen and held for 30 minutes. 643.6 Grams of a 58% weight solution of hexamethylene diisocyanate (HDI) trimer in butyl acetate, xylene and propylene glycol monomethyl ether acetate was then added over 10 minutes and the reaction mixture held at 70 C for 120 minutes and then cooled. % Weight solids was 55.6 and Brookfield viscosity was 78 cps (#3 spindle and 50 rpm).

Example 3

A non-aqueous dispersion polymer containing isocyanate functionality was prepared by the following procedure:

Preparation of Isocyanate-Functional NAD Polymer

To a glass bottle was added 100.0 Grams of the non-aqueous dispersion prepared in Example 2 and 419.2 grams of a 58% weight solution of hexamethylene diisocyanate (HDI) trimer in butyl acetate, xylene and propylene glycol monomethyl ether acetate and the mixture was agitated for 15 minutes. The resulting composition had a percent weight solids of 59.1 and a Brookfield viscosity of 44 cps (#3 spindle and 50 rpm).

Example 4

A non-aqueous dispersion polymer containing isocyanate functionality was prepared by the following procedure:

Preparation of Isocyanate-Functional NAD Polymer

To a 2-liter flask fitted with an agitator, water condenser, and addition pumps and ports was added 172.6 grams of non-aqueous dispersion prepared in Example 2 and the mixture was agitated and heated to 70° C. under nitrogen and held for 30 minutes. 825.2 Grams of a 58% weight solution of hexamethylene diisocyanate (HDI) trimer in butyl acetate, xylene and propylene glycol monomethyl ether acetate was then added over 30 minutes and the reaction mixture held at 70° C. for 120 minutes and then cooled.

Example 5

A non-aqueous dispersion polymer containing isocyanate functionality was prepared by the following procedure:

Preparation of Macromonomer Stabilizer Component

To a 2-liter flask fitted with an agitator, water condenser, thermocouple, nitrogen inlet, heating mantle, and addition pumps and ports was added 280.2 grams xylene and 34.7 grams toluene and the mixture was agitated and heated to reflux (136 to 141° C.). A monomer mixture comprising 120.3 grams styrene, 44.5 grams 2-ethyl hexyl methacrylate, 232.4 grams butyl acrylate, 135.0 grams isocyanatoethyl methacrylate (ICEMA) and 187.7 grams isobornyl methacrylate was then added to the flask via the addition pumps and ports simultaneously with an initiator mixture comprising of 35.8 grams t-butyl peracetate and 103.7 grams xylene. The monomer mixture was added over 240 minutes and the addition time for the initiator mixture is 270 minutes. The batch was held at reflux (135 to 141° C.) throughout the polymerization process. 14.9 Grams of xylene were then added as a shot following completion of the initiator feed and the batch was held at reflux for an additional 30 minutes. 3.43 grams of hydroxyethyl acrylate and 10.9 grams of xylene were then added as a shot to the reaction mixture which was then held at reflux for 30 minutes and then cooled to room temperature. The resulting polymer solution had weight solids of 62.8% and Brookfield viscosity of 280 cps measured at 5 rpm using spindle number 3. The number average molecular weight of the macromonomer was 3,675, weight average molecular weight 8,508 both as determined by GPC (gel permeation chromatography) using polystyrene as standard.

Preparation of Isocyanate-Functional NAD Polymer

To a 2-liter flask equipped as above was added 266.4 grams of macromonomer stabilizer prepared above, 79.04 grams mineral spirits, 209.5 grams heptane, 8.6 grams styrene and 6.9 grams ethyl acetate under agitation and heated to reflux (92 to 95° C.). A monomer mixture of 4.1 grams styrene, 251.6 grams methyl methacrylate, 23.1 grams glycidyl methacrylate, 52.6 grams isocyanatoethyl methacrylate, 2.3 grams allyl methacrylate, 80.5 grams methyl acrylate and 131.2 grams of polymeric stabilizer prepared above was then added to the flask via the addition pumps and ports simultaneously with an initiator mixture of 34.5 grams mineral spirits, 11.2 grams butyl acetate and 6.3 grams t-butyl peroctoate. During this addition, both the monomer and initiator mixtures were simultaneously added over 210 minutes. 17.8 grams of butyl acetate were then added as a shot. The batch was maintained at reflux (92 to 95° C.) throughout the polymerization process. The reaction mixture was then held at reflux for an additional 90 minutes after the initiator and monomer mixture feeds were completed. A mixture of 0.17 grams Vazo® 67 (described above) and 16.4 grams butyl acetate was then added over 5 min. The reaction mixture was again held at reflux for an additional 30 minutes 99 grams of solvent was then removed by distillation and the reaction mixture cooled to room temperature. The resulting non-aqueous polymer dispersion had weight solids of 61.8% and Brookfield viscosity of 280 cps measured at 5 rpm using spindle number 3.

Example 6

A non-aqueous dispersion polymer containing isocyanate functionality was prepared by the following procedure:

Preparation of a Macromonomer Composition

To a 2-liter flask fitted with an agitator, water condenser, thermocouple, nitrogen inlet, heating mantle, and addition pumps and ports was added 181.3 grams ethyl acetate, 83.2 grams butyl acetate and 70.4 grams of the monomer mixture described below under agitation and heated to reflux (89 to 93° C.). To this was added a mixture of 16.5 grams of the initiator solution described below and 10.0 grams of a 10% solution of bis(boron difluoro diphenyl glyoximato)cobaltate (II) in ethyl acetate was then added to the flask as a shot. The remainder of the monomer mixture of 704.2 grams butyl methacrylate was then added to the flask via the addition pumps simultaneously with the remainder of the initiator solution of 9.9 grams Vazo® 52 (described above) and 154.9 grams ethyl acetate. The monomer mixture was added over 180 minutes and the initiator mixture fed over a period of 330 minutes. 6.7 Grams ethyl acetate was then added as a shot after completion of the initiator feed and 16.6 grams of butyl acetate were added as a shot after completion of the monomer feed. The reaction mixture was maintained at reflux (89 to 93° C.) throughout the polymerization process. The reaction mixture was held at reflux for an additional 20 minutes after the initiator feed had been completed. A mixture of 0.3 grams t-butyl peroctoate and 33.3 grams butyl acetate was then added as a shot and the reaction mixture held at reflux for an additional 30 minutes. Following this, the reaction mixture was cooled to room temperature. The resulting polymer solution had weight solids of 59.2% and Brookfield viscosity of 2180 cps measured at 5 rpm using spindle number 3. The number average molecular weight of the macromonomer was 13,550, weight average molecular weight 30,940 both as determined by GPC (gel permeation chromatography) using polystyrene as standard.

Preparation of Non-Aqueous Dispersion Polymer

To a 2-liter flask equipped as above was added 391.9 grams of macromonomer prepared above, 30.3 grams mineral spirits, 254.2 grams heptane and 6.8 grams butyl acetate and 0.1 grams dimethyl ethanol amine under agitation and heated to reflux (84 to 89° C.). A monomer mixture of 52.7 grams styrene, 174.1 grams methyl methacrylate, 33.2 grams glycidyl methacrylate, 86.7 grams hydroxyethyl acrylate, 8.3 grams methacrylic acid and 59.6 grams methyl acrylate was then added to the flask via the addition pumps and ports simultaneously with an initiator mixture of 34.0 grams mineral spirits, 10.9 grams butyl acetate and 6.2 grams t-butyl peroctoate. During the previous addition, both the monomer and initiator mixtures were simultaneously added over 210 minutes. The batch was held at reflux (84 to 89° C.) throughout the polymerization process. 15.6 Grams of butyl acetate were added as a shot after completion of the two feeds and the reaction mixture was then held at reflux for an additional 120 minutes. A mixture of 4.1 grams t-butyl peroctoate and 20.6 grams butyl acetate was then added over 15 minutes. The reaction mixture was held at reflux for an additional 60 minutes. 98.6 Grams of solvent was then removed by distillation and the reaction mixture cooled to room temperature. The resulting polymer dispersion had weight solids of 60.3% and Brookfield viscosity of 540 cps. measured at 5 rpm using spindle number 3.

Preparation of Isocyanate-Functional NAD

To a half pint bottle was added 70 grams of the non-aqueous dispersion prepared above and 88 grams of Luxate® HD-100 isocyanate. The mixture was agitated for 60 minutes Luxate® HD-100 is HDI dimer and is available from Lyondell.

Comparative Example

This comparative example illustrates the preparation of a hydroxyl functional NAD polymer as taught in Barsotti et al U.S. Pat. No. 5,763,528.

The non-aqueous dispersion as prepared in Example 1 was not subjected to post reaction with polyisocyanates, so that hydroxy functionality remained in the stabilizer components and the core.

Paint Examples

The following examples (Examples 7-8) show the preparation of various clear coat compositions prepared with the isocyanate functional non-aqueous dispersion polymers described above, along with comparison examples that show the preparation of clear coat compositions prepared with the hydroxy functional non-aqueous dispersion polymers and clear coat compositions prepared without non-aqueous dispersion polymers. The clear coat compositions were then tested for automotive refinish clear coat application. The following test methods were used:

Test Procedures

Film Hardness

The micro-hardness of the coatings was measured using a Fischerscope hardness tester (model HM100V). The tester was set for maximum force of 100 mN ramped in series of 50, 1 second steps. The hardness was recorded in N/mm$^2$. The film hardness is an indication of when the coating film is ready to be buffed.

Swell Ratio

The swell ratio of the free films (removed from TPO) was determined by swelling in methylene chloride. The free film was placed between two layers of aluminum foil and using a LADD punch, a disc of about 3.5 mm diameter was punched out of the film. The aluminum foil was removed from either side of the free film. Using a microscope with 10x magnification and a filar lens the unswollen diameter ($D_o$) of the film measured. Four drops of methylene chloride were added to the film, the film was allowed to swell for a few seconds and then a glass slide was placed over it. The swell ratio was then calculated as:

Swell ratio=$(D_s)^2/(D_o)^2$

The swell ratio is a measure of the crosslink density of the film and the early cure properties.

Dry Time

The dry time of a coated layer of composition was measured as BK3 surface dry time and BK4 through dry time using a BK dry time tester.

The surface dry time is a measure of physical dry or dry-to-touch (which allows for minimizing dirt pick up and rapid application of subsequent coating layers) and the through dry time is a measure of through dry or chemical dry (which allows for early buffing of a vehicle and the removal of the vehicle from the spray booth to outside storage). In automotive refinishing, a coating which has both early physical dry and chemical dry has the ability to greatly improve the productivity of a refinish shop. To get these properties and also meet today's low VOC requirements (<4.4 lbs/gal VOC) is truly an outstanding accomplishment.

Gel Fraction

The gel fraction of free films (removed from TPO) was determined in boiling acetone. Approximately 0.5 grams of film (carefully weighed) was placed in a wire mesh screen. The film in the screen was boiled in acetone for 6 hours, allowed to cool. The screen were removed from the acetone, dried overnight, then reweighed. The reading was reported as:

Percent gel fraction=(wt. of film after boiling/wt. of film before boiling)×100.

Thus, a percent gel fraction reading of 100 indicates complete crosslinking, i.e., none of the test film dissolved in acetone and a reading of 0 indicates that no crosslinking took place, i.e., all of the test film dissolved in acetone.

$H_2O$ Spot

Water spot rating is a measure of how well the film is crosslinked early in the cure. If water spot damage is formed on the film, this is an indication that the cure is not complete and further curing is needed before the film can be wet sanded or buffed or moved from the spray booth to outside storage. The water spot rating is determined in the following manner.

Freshly coated, sprayed or draw down, panels were laid on a flat surface, painted surface up. Deionized water was then applied with a pipette at 1 hour timed intervals. A drop of approximately ½ inch in diameter was placed on the panel and allowed to evaporate. The location of the droplet was identified to later rate the results. After evaporation, the panel was checked for deformation and discoloration of the spotted areas. The panel was wiped lightly with a piece of cheesecloth wetted with deionized water, which was followed by lightly wiping the panel dry with a piece of dry cheesecloth. The degree of deformation and discoloration was then rated on a visual scale of 1 to 10 scale, with 10 being the best, i.e., no evidence of spotting or distortion or discoloration, 9 being barely detectable, 8 slight ring, 7 very slight discoloration or slight distortion, 6 slight loss of gloss or slight discoloration, 5 definite loss of gloss or discoloration, 4 slight etching or definite distortion, 3 slight lifting, bad etching or discoloration, 2 definite lifting, and 1 being the worst, i.e., dissolving of film.

Example 7

This example compares the isocyanate NAD, to the hydroxyl functional NAD, versus a clear coat system without NAD. Clear coat compositions were prepared from the following constituents:

|  | A | B | C |
|---|---|---|---|
| Part I |  |  |  |
| Hydroxy functional Acrylic Polymer (prepared below) | 87.85 | 78.92 | 78.85 |
| Hydroxy functional NAD (prepared in Comparative Example) |  |  | 8.91 |
| 25% Tinuvin ® 384 (UV screener from Ciba-Geigy) in toluene/methyl ethyl ketone | 3.98 | 3.98 | 3.98 |
| Tinuvin ® 292 (Light stabilizer from Ciba-Geigy) | 1.02 | 1.02 | 1.02 |
| Butyl acetate | 23.13 | 20.56 | 23.16 |
| 2% Dibutyltin dilaurate in ethyl acetate | 1.37 | 1.37 | 1.37 |
| 50% BYK ® 306 (Silicone flow control additive from BYK Chemie) in xylene | 1.75 | 1.75 | 1.75 |
| Acetic acid | .27 | .27 | .27 |
| Xylene | 23.13 | 20.56 | 23.16 |
| TOTAL PART I | 142.5 | 128.43 | 142.48 |
| PART II |  |  |  |
| 58% Desmodur ® 3300 (HDI trimer from Bayer AG) in solvent | 27.5 |  | 27.52 |
| Isocyanate Functional NAD (prepared in Example 1) |  | 41.57 |  |

The constituents of parts I and II were blended together to form a clear coat composition that was 42.5% solids with NCO/OH of 1.03. The coatings were applied with a 10 mil drawdown blade on glass, TPO (thermal polyolefin) and Uniprime (ED5000) to give films from 1.5-2.5 mils. The films were dried at room temperature, at 285° F. for 30 minutes and then dried at room temperature, or at 140° F. for 30 minutes than at room temperature.

Paint Results
The following is a comparison of the important properties of the compositions:

| Properties | A | B | C |
|---|---|---|---|
| BK3 Dry Time | 61 | 57 | 57 |
| $H_2O$ Spot 1 Hr | 8 | 8 | 8 |
| $H_2O$ Spot 2 Hr | 9 | 9 | 9 |
| $H_2O$ Spot 4 Hr | 10 | 10 | 10 |
| Swell ratio 3 hr | Failed | 2.28 | Failed |
| Swell ratio 1 day | 1.89 | 1.71 | 1.74 |
| Swell ratio 7 days | 1.63 | 1.59 | 1.55 |
| Swell ratio 30 days | 1.62 | 1.54 | 1.52 |
| Swell 285° F. | 1.61 | 1.66 | 1.60 |
| Swell ratio 140° F. cooldown | 2.41 | 2.11 | Failed |
| Swell 140° F. 30 days | 1.62 | 1.63 | 1.55 |
| Fischer hardness 1 day | 52 | 52 | 55 |
| Fischer hardness 7 days | 110 | 111 | 110 |
| Fischer hardness 30 days | 128 | 132 | 124 |
| Gel fraction 30 days | 89 | 90 | 89 |
| Gel fraction 285° F. bake | 93 | 96 | 95 |

The above results show that addition of isocyanate functional NAD improves the early cure properties for the clear coat composition. This is seen by lower early swell ratios. Other basic properties of the clear coat (such as appearance, i.e., gloss and distinctness of image) were maintained at desired levels.

Preparation of Hydroxy-Functional Acrylic Polymer
(used above)

To a 2-liter flask fitted with an agitator, water condenser, thermocouple, nitrogen inlet, heating mantle, and addition pumps and ports was added 305.3 gms. xylene which is agitated and heated to reflux temperature (137 to 142° C.). A monomer mixture comprising of 106.1 grams styrene, 141.4 grams methyl methacrylate, 318.3 grams isobutyl methacrylate, 141.4 grams hydroxyethyl methacrylate and 10.4 grams xylene was then added to the flask via the addition pumps and ports simultaneously with an initiator mixture comprising 17.0 grams t-butyl peracetate and 85.2 grams xylene. The monomer mixture was added over 180 minutes and the addition time for the initiator mixture was also 180 minutes. The batch was held at reflux (137 to 142° C.) throughout the polymerization process. An initiator mixture comprising of 4.3 grams t-butyl peracetate and 57.8 grams methyl ethyl ketone was then immediately added to the reaction mixture over 60 minutes and the batch was subsequently held at reflux for 60 minutes. The batch was then cooled to below 90° C. and 13.0 grams of methyl ethyl ketone was added. The resulting polymer solution has weight solids of 60% and Gardner Holdt viscosity of Z1. The number average molecular weight of the acrylic polymer was 5,000, weight average molecular weight was 11,000, as determined by gel permeation chromatography (polystyrene standard).

Example 8

This example compares an isocyanate NAD made with ICEMA monomer, to a clear coat system without NAD. Clear coat compositions were prepared from the following constituents:

|  | A | B |
|---|---|---|
| Part I |  |  |
| Hydroxy Functional Oligomer (prepared in Procedure 3 of Barsotti et al U.S. Pat. No. 6,221,494 issued Apr. 24, 2001) | 63.22 | 55.92 |
| 25% Tinuvin ® 384 (described above) in toluene/methylethyl ketone | 5.51 | 5.51 |
| Tinuvin ® 292 (described above) | 1.41 | 1.41 |
| Butyl acetate | 51.46 | 44.55 |
| 2% Dibutyl tin dilaurate in ethyl acetate | 1.39 | 1.39 |
| 50% BYK ® 306 (described above) in xylene | 1.90 | 1.90 |
| Acetic acid | .38 | .38 |
| Total Part I | 126.30 | 112.09 |
| Part II |  |  |
| 58% Desmodur ® 3300 in Solvent | 43.70 | 36.29 |
| Isocyanate Functional NAD (prepared in Example 5) |  | 21.62 |

The constituents of parts I and II were blended together to form a clear coat composition that was 60% solids with NCO/OH of 1.03. The coatings were applied with a 10 mil drawdown blade on glass, TPO (thermal polyolefin) and Uniprime (ED5000) to give films from 2-3 mils. The films were dried at room temperature, at 285 F for 30 minutes and then dried at room temperature, or at 140 F for 30 minutes than at room temperature.

| Paint Results | | |
|---|---|---|
| Properties | A | B |
| BK4 Dry Time | 165 | 158 |
| H$_2$O Spot 1 Hr | 4 | 6 |
| H$_2$O Spot 2 Hr | 8 | 8 |
| Swell ratio 4 hr | 2.04 | 1.73 |
| Swell ratio 1 day | 1.74 | 1.77 |
| Swell ratio 7 days | 1.61 | 1.65 |
| Swell 285° F. | 1.64 | 1.74 |
| Swell ratio 140° F. Cooldown | 2.12 | 2.12 |
| Swell 140° F. 7 days | 1.67 | 1.61 |
| Fischer hardness 1 day | 9 | 9 |
| Fischer hardness 7 days | 36 | 38 |
| Fischer hardness 1 day 14-bake | 30 | 42 |
| Fischer hardness 7 days 14-bake | 108 | 118 |
| Gel fraction 30 days | 90 | 91 |

The above results show that the addition of isocyanate NAD improves early cure for the paint. This is seen by the improved water spot rating and lower early swell ratios.

The remaining isocyanate functional NADs prepared in Examples 1-6 above were also tested in automotive clear coat systems and showed similar improvement in early cure while the other basic properties (such as appearance, i.e., gloss and distinctness of image) were maintained at the desired levels.

In summary, the use of isocyanate functional NAD's allows for an excellent balance of physical dry (dry-to-touch) and chemical dry (through dry) and therefore increased productivity of an automotive refinish shop while also meeting today's low VOC requirement for automotive applications.

Various modifications, alterations, additions or substitutions of the components of the compositions of this invention will be apparent to those skilled in the art without departing from the spirit and scope of this invention. This invention is not limited to the illustrative embodiments set forth herein, but rather the invention is defined by the following claims.

We claim:

1. An isocyanate adduct useful as an isocyanate crosslinking agent in solvent borne coating compositions, wherein said isocyanate adduct is a product obtained by the reaction of:
   (1) a gelled acrylic polymer with
   (2) an excess of polyisocyanate compounds,
   wherein said gelled acrylic polymer is dispersed in an organic liquid carrier, and consists essentially of:
      (i) a crosslinked core comprising polymerized ethylenically unsaturated monomers, wherein the core is not soluble in the organic liquid carrier, and
      (ii) linear stabilizer polymeric components chemically grafted to said core, wherein said linear stabilizer components have weight average molecular weights in the range of about 500-20,000 as determined by GPC (gel permeation chromatography) using polystyrene as standard,
   wherein:
   (a) said stabilizer components comprise polymerized ethylenically unsaturated monomers;
   (b) said stabilizer components are soluble in the organic liquid carrier;
   (c) the core (i), the stabilizer polymeric components (ii), or both (i) and (ii) contain isocyanate-reactive hydroxy and/or secondary amine functional groups attached thereto; and
   (d) the excess of polyisocyanate compounds are present in an amount so that the ratio of NCO to OH/NH groups ranges from 5:1 to 50:1.

2. The adduct of claim 1, wherein the dispersed acrylic polymer comprises 30-70% by weight of the core and 70-30% of linear stabilizer polymeric components.

3. The adduct of claim 1, wherein the linear stabilizer polymeric components consist of macromonomers that are polymerized into the core via a single terminal point of ethylenic unsaturation of the macromonomers and the monomers that form the macromonomers are polymerized in the presence of a cobalt chain transfer agent to provide the single point of ethylenic unsaturation.

4. The adduct of claim 1, wherein the isocyanate reactive hydroxyl and/or secondary amine functional groups of the dispersed gelled acrylic polymer are concentrated essentially only on the stabilizer components.

5. The adduct of claim 1, wherein the core of the dispersed gelled acrylic polymer consists of polymerized monomers of styrene, hydroxy ethyl acrylate, methyl methacrylate, glycidyl methacrylate, methacrylic acid, allyl methacrylate and methyl acrylate and the linear stabilizer components of the dispersed gelled acrylic polymer consisting of polymerized monomers of butyl methacrylate, isobornyl methacrylate, 2-ethyl hexyl methacrylate, hydroxy ethyl methacrylate and t-butyl aminoethyl methacrylate, with the polymer being post reacted with a polyisocyanate to attach isocyanate groups thereto.

6. The adduct of claim 1, wherein the core of the dispersed gelled acrylic polymer consists of polymerized monomers of styrene, methyl methacrylate, glycidyl methacrylate, hydroxy ethyl acrylate, methacrylic acid, methyl acrylate and the linear stabilizer components of the dispersed acrylic polymer consist of polymerized monomers of styrene, butyl methacrylate, butyl acrylate, hydroxy ethyl acrylate, methacrylic acid, isobornyl methacrylate and glycidyl methacrylate, with the polymer being post reacted with a polyisocyanate to attach isocyanate groups thereto.

7. The adduct of claim 1 wherein the polyisocyanate is selected from the group consisting of 1,6-hexamethylene diisocyanate, isophorone diisocyanate, the trimer of 1,6-hexamethylene diisocyanate or the trimer of isophorone diisocyanate.

8. The adduct of claim 1 used as an isocyanate crosslinking agent wherein, after the reaction of the gelled acrylic polymer with the excess of polyisocyanate compounds, a portion of the excess of polyisocyanate compounds remain unattached to said gelled acrylic polymer.

9. The isocyanate adduct of claim 1 wherein the polyisocyanate compounds are selected from the group consisting of aromatic, aliphatic and cycloaliphatic polyfunctional isocyanates having at least two isocyanate groups per molecule.

10. The isocyanate adduct of claim 1 wherein the polyisocyanate compounds are selected from the group consisting of 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopenthylene diisocyanate, 1,4-cyclohexylene diisocyanate, 1,3-phenylene diisocyanate, 1,5-naphthalene diisocyanate, bis-(4-isocyanatocyclohexyl)-methane, diisocyanatodiphenyl ether, triphenylmethane triisocyanate, 1,3,5-benzene triisocyanate, 2,4,6-toluene triisocyanate, the trimer of hexamethylene diisocyanate and the trimer of isophorone diisocyanate.

* * * * *